United States Patent [19]

Miller

[11] Patent Number: 4,889,880

[45] Date of Patent: Dec. 26, 1989

[54] MODIFIED ASPHALT COMPOSITIONS

[75] Inventor: H. Richard Miller, Solon, Ohio

[73] Assignee: The Lubrizol Corporation, Wickliffe, Ohio

[21] Appl. No.: 167,596

[22] Filed: Mar. 14, 1988

Related U.S. Application Data

[63] Continuation-in-part of Ser. No. 879,866, Jul. 27, 1986, abandoned.

[51] Int. Cl.$^4$ .................... C08L 23/18; C08L 95/00
[52] U.S. Cl. ............................... 524/71; 524/59; 524/70
[58] Field of Search .................. 524/70, 71, 59; 525/54.5

[56] References Cited

U.S. PATENT DOCUMENTS

| | | | |
|---|---|---|---|
| 2,485,625 | 10/1949 | Merley et al. | 524/70 |
| 2,745,762 | 5/1956 | Soderberg | 524/70 |
| 3,296,165 | 1/1967 | Kemp | 524/70 |
| 3,303,151 | 2/1967 | Peters et al. | 524/70 |
| 3,336,252 | 8/1967 | Raichle et al. | 524/70 |
| 3,414,533 | 12/1968 | Trieschmann et al. | 524/69 |
| 3,497,371 | 2/1970 | Chang | 524/70 |
| 3,634,293 | 1/1972 | Bonitz | 524/70 |
| 3,635,863 | 1/1972 | Drukker | 524/70 |
| 3,640,940 | 2/1972 | Gotshall | 524/70 |
| 3,703,393 | 11/1972 | Koons | 524/70 |
| 3,824,110 | 7/1974 | Pelz et al. | 524/70 |
| 3,844,668 | 10/1974 | Winters et al. | 524/70 |
| 3,915,914 | 10/1975 | Binder et al. | 524/71 |
| 3,919,148 | 11/1975 | Winters et al. | 524/70 |
| 3,992,340 | 11/1976 | Bonitz | 524/70 |
| 4,000,095 | 12/1976 | Van Den Berg | 524/70 |
| 4,085,078 | 4/1978 | McDonald | 524/70 |
| 4,091,134 | 5/1978 | Vemura et al. | 524/70 |
| 4,101,478 | 7/1978 | Kostjuchenko et al. | 524/70 |
| 4,148,780 | 4/1979 | Blümel et al. | 524/70 |
| 4,166,049 | 7/1979 | Huff | 524/70 |
| 4,171,295 | 10/1979 | Fruse et al. | 524/70 |
| 4,240,946 | 12/1980 | Hemersam | 524/70 |
| 4,361,663 | 11/1982 | Agarwal et al. | 524/70 |
| 4,361,672 | 11/1982 | Agarwal et al. | 524/70 |
| 4,385,142 | 5/1983 | Böhm et al. | 524/70 |

*Primary Examiner*—Allan M. Lieberman
*Attorney, Agent, or Firm*—Robert A. Franks; Frederick D. Hunter; Forrest L. Collins

[57] ABSTRACT

Modified asphalt compositions are described which comprise
(A) asphalt, and
(B) a minor amount, sufficient to reduce or retard degradation of the asphalt in service, of at least one polymer derived from a butene having a weight average molecular weight (Mw) of about 5,000 to about 1,000,000. Generally, the modified asphalt composition will contain from about 0.01 to about 10% by weight, based on the weight of the asphalt, of the polymer as defined. The modified asphalt compositions of the present invention are useful in roofing applications and in preparing aggregate-containing asphalt concretes which can be employed as paving compositions.

4 Claims, No Drawings

MODIFIED ASPHALT COMPOSITIONS

CROSS REFERENCE TO RELATED APPLICATION

This application is a continuation-in-part application of application Ser. No. 879,866, filed on June 27, 1986, now abandoned, the disclosure and claims of which are hereby incorporated by reference in their entirety.

TECHNICAL FIELD OF THE INVENTION

This invention relates to modified asphalt compositions and more particularly to modified asphalt compositions comprising asphalt and a minor amount, sufficient to reduce or retard degradation of the asphalt in service, of at least one polymer having a weight average molecular weight (Mw) of about 5,000 to about 1,000,000. The modified asphalt compositions are useful in a variety of applications including roofing and paving. The modified asphalts are useful particularly in preparing improved asphalt concrete compositions for paving compositions.

BACKGROUND OF THE INVENTION

The term "asphalt" or "asphalt cement" as used in the description of the present application refers to any of a variety of solid or semi-solid materials at room temperature which gradually liquify when heated, and in which the predominant constituents are naturally occurring bitumens of which are obtained as residue in petroleum refining. Asphalt is further defined by Kirk-Othmer, Encyclopedia of Chemical Technology, Vol. 3, Third Ed. (1978) pp. 284-327, John Wiley & Sons, New York. An additional discussion appears in the publication entitled "A Brief Introduction to Asphalt and Some of its Uses", Manual Series No. 5 (MS-5), The Asphalt Institute, 7th Ed., September, 1974. Both of these references are hereby incorporated by reference.

Asphalt cements have found particular utility when combined with aggregates. Such combinations, generally referred to as "asphalt concrete", are employed extensively as paving compositions for roads, roofs, driveways, parking lots, airport runways, etc. The asphalt is converted to a fluid state when paving a road. One fluid form is the suspension or emulsion of the asphalt in water. After spreading and compressing the aggregate-containing asphalt, water evaporates or separates, and the asphalt hardens into a continuous mass. Another form of asphalt employed in road construction is a cutback, i.e., a liquid petroleum product produced by fluxing an asphaltic base with a suitable organic solvent or distillate. A road is formed by paving the aggregate-containing cutback and evaporating the volatile distillate from the mass. An advantage of using the above road construction techniques is the avoidance of high temperature application. In an alternative and most widely used technique, the asphalt and aggregate can be mixed and applied at elevated temperatures at the fluid state of the asphalt to form the road. This form of asphalt, which is neither cut-back nor emulsified generally is referred to as asphalt cement.

The degree and rate of hardening of asphalt cement during application and while in service ("age hardening") are factors affecting the durability of a surface such as a road pavement. A certain amount of hardening of a freshly applied surface is often desirable in order to allow the newly placed surface to be placed into service quickly. However, excessive hardening and loss of ductility of an asphalt based surface can dramatically reduce its useful lifetime. Januszke, in "Industrial Engineering Chemistry Product Research and Development", Vol. 10, (1971), 209-213, indicates that lead and zinc diethyldithiocarbamates were effective in inhibiting the adverse hardening.

In certain geographic areas, such as desert regions in the western and southwestern United States, deterioration of an asphalt road may occur quickly and is often extensive. Embrittlement and cracking of the road surface often result.

Because of the high demand for better quality materials for roofs and for the pavement of roads, airfields and other applications, there have been many suggestions in the art for producing improved asphaltic compositions.

It is known in the art that excessive age hardening of paving asphalts can be reduced through the use of certain antioxidants such as lead or zinc dithiocarbamates. The above-mentioned reference by Januszke discusses an evaluation of the effect of 24 antioxidants on paving asphalt durability and is incorporated by reference for its teachings regarding the problem and methods of assessing the performance of additives.

U.S. Pat. No. 3,992,340 describes vulcanized molding compositions based on bitumen, olefin polymers and sulfur that have utility as additives to asphalt and asphalt mixtures in order to increase the ductility of these materials.

U.S. Pat. No. 3,634,293 describes compositions containing bitumen, olefin polymers, a basic substance and sulfur. These compositions are useful as sealing compounds and for the production of sheeting and film.

It has also been suggested, for example, that the softening point of asphalt can be increased by incorporating into the asphalt a liquid polyolefin oil. In U.S. Pat. No. 3,703,393, a method is described for increasing the softening point and increasing the penetration of an air-blown asphalt by mixing the asphalt with a liquid polyolefin oil having an average molecular weight of 500-2000.

U.S. Pat. No. 4,166,049 describes a process of providing a rubberized asphalt from reclaimed rubber produced from whole scrap tires suitable for use in road and highway construction.

SUMMARY OF THE INVENTION

Modified asphalt compositions are described which comprise
(A) asphalt, and
(B) a minor property improving amount, sufficient to reduce or retard degradation of the asphalt in service, of at least one polymer derived from a butene, said polymer having a weight average molecular weight (Mw) of about 5,000 to about 1,000,000. Generally, the modified asphalt composition will contain from about 0.01 to about 10% by weight, based on the weight of the asphalt, of the polymer as defined. The modified asphalt compositions of the present invention are useful in roofing and in preparing aggregate-containing asphalt concretes which can be employed as paving compositions.

DESCRIPTION OF THE PREFERRED EMBODIMENTS

The present invention relates to modified asphalt compositions, and more particularly, to modified asphalt compositions such as asphalt cements which, when combined with aggregates, will form asphalt concretes exhibiting significantly improved physical properties, and, in particular, desirable age-hardening characterisitcs.

The asphalts which can be modified in accordance with the invention include natural asphalts and petroleum tar (petroleum asphalt) which is generally known for roofing and paving applications. The natural asphalt includes, for example, asphaltite such as gilsonite, grahamite and glance pitch; lake asphalt such as trinidad asphalt; and rock asphalt. The petroleum asphalts include straight asphalt obtained by distillation of a crude oil (unblown and substantially unoxidized), blown asphalt produced by blowing an oxygen-containing gas into a straight asphalt in the presence or absence of a catalyst, solvent-extracted asphalt obtained when asphaltic material is separated from the petroleum fraction containing it by the use of propane or other solvents, and cut-back asphalt which is a mixture of straight asphalt and a light petroleum solvent. The petroleum tars that may be modified include oil gas tar obtained as a by-product when gases are produced from petroleum fractions, such tar in refined form, cut-back tar obtained by mixing a light petroleum fraction with such tar, and tar pitch obtained as a residue by removing the volatile fraction from such tar. Any of these kinds of asphalt may be used singly or jointly. Straight asphalt is preferred for paving applications and oxidized and blown asphalts are preferred for roofing applications.

As used herein, the term "asphalt cement" refers to any of a variety of substantially unblown or unoxidized solid or semi-solid materials at room temperature which gradually liquify when heated. Its predominant constituents are bitumens, which may be naturally occurring or obtained as the residue of refining processing. The asphalt cements are generally characterized by a penetration (PEN, measured in tenths of a millimeter, dmm) of less than 400° at 25° C., and a typical penetration is between 40 and 300 (ASTM Standard, Method D-5). The viscosity of asphalt cement at 60° C. is more than about 65 poise.

Asphalt cements are often defined in terms specified by the American Association of State Highway Transportation Officials (AASHTO) AR viscosity system. Two sets of typical specifications are as follows.

| AASHTO M-226 | | | | | | |
|---|---|---|---|---|---|---|
| TEST | AC 2.5 | AC 5 | AC 10 | AC 20 | AC 30 | AC 40 |
| Viscosity @ 140° F., poise (AASHTO T-202) | 250 ± 50 | 500 ± 100 | 1000 ± 200 | 2000 ± 400 | 3000 ± 600 | 4000 ± 800 |
| Viscosity @ 275° F., cSt, minimum(AASHTO T-201) | 125 | 175 | 250 | 300 | 350 | 400 |
| Pen. @ 77° F., minimum (AASHTO T-49) | 220 | 140 | 80 | 60 | 50 | 40 |
| Flash Point, COC Minimum °F. | 325 | 350 | 425 | 450 | 450 | 450 |
| Ductility After TFOT (AASHTO T-179) @ 77° F., 5 CM/MIN, minimum | 100 | 100 | 75 | 50 | 40 | 25 |
| Viscosity After TFOT (AASHTO T-179) @ 140° F., poise minimum | 1000 | 2000 | 4000 | 8000 | 12000 | 16000 |

| TEST | AR1000 | AR2000 | AR4000 | AR8000 | RT16000 |
|---|---|---|---|---|---|
| Viscosity @ 140° F., poise (AASHTO T-202) | 1000 ± 250 | 2000 ± 500 | 4000 ± 1000 | 8000 ± 2000 | 16000 ± 4000 |
| Viscosity @ 275° F., cSt, minimum(AASHTO T-201) | 140 | 200 | 275 | 400 | 500 |
| Pen. @ 77° F., minimum (AASHTO T-49) | 65 | 40 | 25 | 20 | 20 |
| Percent Of Original Pen. @ 77° F., minimum | — | 40 | 45 | 50 | 52 |
| Ductility @ 77° F., minimum, 5 cm/min | 100 | 100 | 75 | 75 | 75 |

Bitumens or asphalts are modified in accordance with the procedure of the invention by incorporating therein (B) a minor property improving amount, sufficient to reduce or retard degradation of the asphalt in service, of at least one polymer derived from a butene or a copolymer of said butene with an aromatic mono-olefin, said polymer having a weight average molecular weight (Mw) of about 5,000 to about 1,000,000 as determined by gel permeation chromatography.

The above-mentioned homopolymers can be prepared by a number of polymerization techniques well known to those of skill in the art. It should be noted that "homopolymer" as used herein, describes polymers made from mono-olefins having the same number of carbon atoms. Thus, polymers made from a mixture of butene-1 and isobutylene are, in the terms of this specification and the appended claims, homopolymers of butylene. When they contain predominantly units derived from a single isomer, they may be referred to as polymers of that isomer; but, such terminology does not exclude the possibility of the presence of a minor amount of units derived from other isomers. Thus, a "polyisobutylene polymer" might contain units, 80% of which are derived from isobutylene, 15% from 1-butene and 5% from 2-butene.

The particularly preferred homopolymers of butene are 1-butene, 2-butene and isobutene. The most preferred homopolymers are those of isobutene.

The polymer (B) of the polymeric composition of this invention also may be copolymers of butene with one or more aromatic olefins. Copolymers containing at least 50% by weight of said butene and up to about 50% by weight of an aromatic olefin are useful. The aromatic olefins are preferably vinyl aromatic monomers of up to 12 carbon atoms including styrene and substituted styrenes such as the methyl styrenes, alpha-halostyrenes, lower alkyl-substituted styrenes such as alpha-methylstyrene, alpha-ethylstyrene, para-tert-butylstyrene and para-lower-alkoxystyrenes.

Techniques such as Ziegler, cationic, free-radical, anionic, emulsion polymerization and so forth can be used in appropriate circumstances to prepare these polymers. A particularly convenient technique for polymerizing such olefins for use in this invention is through the use of a Lewis acid catalyst such as aluminum chloride, boron trifluoride, titanium tetrafluoride and the like. These polymerizations are well known in the art and need not be described further at this point.

The polymer that is useful in the compositions of the present invention is a polyisobutene of Mw 53,500.

In general, it is preferred that the homopolymers of the present invention, i.e., component (B), for reasons of oxidative stability, contain no more than 5% unsaturation on the basis of the total number of carbon-to-carbon covalent linkages present within an average molecule. Such unsaturation can be measured by a number of means well known to those of skill in the art, such as infrared, NMR, etc. More preferably these polymers contain no discernable unsaturation.

The following examples serve to illustrate the preparation of component (B) used in this invention and is not intended as limiting thereof.

EXAMPLE 1

Component (B) is produced in a continuous unit operation by reacting isobutylene in a butane-isobutylene environment using aluminum chloride catalyst at between $-12°$ to $-30°$ C. A portion of the reactor contents is withdrawn to determine the number average molecular weight and the reaction temperature is adjusted to obtain a number average molecular weight in the range of 75,000 to 130,000.

Methylamyl alcohol is added to destroy the activity of the aluminum chloride which is then removed as the stream is passed through a filter. Mineral oil is added and the polymer content (10–20% of the total stream) is removed and the balance of the stream (mainly unreacted isobutylene and butane) is combined with fresh (99% plus) isobutylene. A polyisobutylene of weight average molecular weight of about 119,000 is obtained that contains 69% oil.

EXAMPLE 2

To 68,800 parts of the oil-containing material prepared in Example 1 is added one part of an azo dye in an aromatic solvent that is manufactured by Morton Chemical Company, Patterson, N.J.; 150 parts of 2,6-di-t-butyl-p-cresol and 31,050 parts mineral oil. The contents are blended until a homogeneous liquid is obtained.

The above-described polymers can be combined with asphalt by techniques known in the art. Asphalts modified in this manner exhibit improved age hardening characteristics and reduced deterioration.

Generally, the polymers will be mixed with asphalt in the fluid or molten condition to dissolve or disperse the polymer in the asphalt. Generally, the asphalt is heated to an elevated temperature to improve the fluidity of the asphalt. Temperatures of from about 100°–225° C. are sufficient although the precise temperature for any particular asphalt will depend on the source and nature of the asphalt material.

The amount of the polymers in the modified asphalt compositions of the present invention is an amount which is sufficient to reduce or retard degradation of the asphalt in service. In one embodiment, the amount will vary from as little as 0.01% up to about 20% or more of the polymer based on the weight of the asphalt. Generally, however, the amount of polymer will be less than about 10% by weight of the weight of the asphalt. Most often, the amount of polymer incorporated in the asphalt will range from about 0.2 to about 3% or 5% by weight.

When mixing the polymers of the present invention with the asphalt material, the asphalt should be at an elevated temperature and in a flowable fluid state. By way of example, a suitable temperature is one at which the bitumen or asphalt is thinner than molasses at ambient temperature, typically thicker than water, and is flowable or pourable without stirring. Thus, a quantity of the asphalt should be sufficiently fluid to flow when placed on a solid surface. This is particularly advantageous if it is contemplated that the asphalt cement would be circulated under high speed agitation to provide a uniform dispersion or solution.

To accomplish the foregoing solution or dispersion, for a conventional asphalt cement (e.g., one designated AR-4000 by the Asphalt Institute, a suitable mixing temperature is on the order of a minimum of about 100° C. for soft asphalt, and, preferably, on the order of 120° C. or more. At temperatures below this level, mixing times for total dispersion, even if feasible, become excessive economically. On the other hand, the temperature of mixing should not be so high as to promote other reactions which could weaken the asphalt material. For this reason, it is preferred not to heat the asphalt cement above about 225° C., and thus, suitable mixing temperatures are from about 100° C. to about 225° C. with a preferred mixing temperature of from 120°–180° C. depending upon the type of asphalt and the mixing times and speeds. At temperatures on the order of 170° C., 20 to 30 minutes are sufficient under conventional mechanical stirring speeds as with an impeller type stirrer. On the other hand, mixing times as low as several minutes may be sufficient under certain circumstances. In some instances, it may be desirable to perform the mixing step under an inert gas atmosphere such as nitrogen. The use of nitrogen precludes the presence of oxygen at elevated temperatures which tends to harden the final product.

The modified asphalt compositions of the present invention are particularly useful for preparing improved roofing asphalts, other asphalt coating compositions, and particularly for preparing improved aggregate-containing asphalts such as employed in the paving of roads, roofs, bridges, airport runways, sidewalks, etc. The modified asphalt compositions of the present invention in fluid form are mixed generally with preheated, predried aggregates to form the homogeneous mixture of uniformly coated aggregates in a paving composition, typically as performed at an asphalt mixing plant. The aggregate preferably is heated under conditions of time and temperature to drive off essentially all free moisture prior to mixing. During mixing, both the aggregate and the modified asphalt are typically at temperatures of about 100°–160° C. Before the composition is cooled to a temperature at which it looses its workability, the composition is spread on a road bed, compacted and permitted to cure. After curing, the road comprises aggregate bound by a matrix of modified asphalt binder.

The modified asphalt compositions of the present invention may also be useful for preparing improved seal coats. A seal coat is generally applied as a hot asphalt cement, cutback asphalt cement, or emulsified asphalt cement. The seal coat is generally applied at a rate of about 0.05 to about 0.8 gallons per square yard of surface. The preferred application rate is about 0.35 gallons per square yard of surface. The liquid material is generally sprayed from a truck. The aggregate is placed on top of the asphalt cement. Rolling or compacting the aggregate into the asphalt cement finishes the application.

The function of the seal coat is to prevent damage to paving surfaces by providing a barrier to exclude the admittance of moisture to the underlying surfaces. The useful function of the addition of polymer to this barrier is determined by the physical/chemical nature of the polymer modifying the consistency of the asphalt cement. This consistency can be defined as incorporating viscosity, stickiness, ductibility and flexibility.

Certain polymers are used in the United States today to improve the aggregate retention. Based upon the data provided in the tables, the composition of this invention also provides that protection.

The modified asphalt compositions of the present invention, after formation, may be handled by conventional techniques to maintain them in fluid form under road building conditions. For example, the modified asphalts may be formed into a cutback by fluxing the asphalt with a suitable volatile solvent or distillate. The modified asphalt cutback may then be directly mixed with aggregate and applied as a paving composition in fluid form, possibly at ambient temperatures. Another conventional technique for fluidizing the modified asphalt cement prior to mixing with aggregate and forming into a paving composition is to emulsify the modified asphalt by known techniques. An advantage of this method of fluidizing is that after mixing with the aggregate, it may be applied as a paving composition at ambient temperature. In addition to the above, the modifier may be added to a previously prepared asphalt cutback or asphalt emulsion.

The term "aggregate" as used in the specification and claims is intended to include solid particles having a range of sizes including fine particles such as sand to relatively coarse particles such as crushed stone, gravel or slag.

The ratio of aggregate to modified bitumen or asphalt depends upon their properties and the desired end use. For typical road paving compositions, the paving composition will comprise a minimum of about 85% by weight of aggregate, and generally between about 90-96% by weight of the total paving composition will be aggregate.

Aggregate containing modified asphalt compositions can be prepared in accordance with the present invention by techniques known to the art. In one method, a modified asphalt cement is prepared in accordance with the method of the present invention, and the modified asphalt cement thereafter is mixed with an aggregate at an elevated temperature to form the desired paving composition.

The modified asphalt compositions of the present invention, and the aggregate containing asphalt compositions prepared utilizing the modified asphalt compositions of the present invention are characterized by an ability to retain their desirable characteristics in service. In particular, the modified asphalts of the present invention retain their consistency and ductility for longer periods in service than do asphalt compositions which have not been modified in accordance with the present invention.

The following examples illustrate the modified asphalt compositions and aggregate-containing compositions of the present invention.

EXAMPLE A

A California Valley asphalt cement (CV) meeting the specification of AASHTO AR 4000 is modified with 3% by weight based on the weight of the asphalt of the polymer of Example 2 (containing 78% oil) by thoroughly mixing the polymer with the fluidized asphalt.

Example B

| Component | Amount (% wt) |
|---|---|
| (1) Aggregate Asphalt Cement | 93.5 6.5 |

The above aggregate has a composition of 49.2% crushed Canadian limestone #8 and 50.8% lake sand.

| Gradation | (% Passing) |
|---|---|
| ½" | 100.0 |
| ⅜" | 98.0 |
| #4 | 60.0 |
| #16 | 46.5 |
| #50 | 10.8 |
| #200 | 1.8 |
| (2) Modified Asphalt of Example A | 6.5 |

Liquid asphalt cements treated with the compositions of the invention show major benefits in retained ductility and/or flexibility when exposed to severe aging as demonstrated by the California Tilt-Oven Asphalt Durability Test and the Thin Film Oven Test. Measurements of low temperature elastic modulus, after accelerating laboratory aging, show significant improvement with the presence of the polymer composition of the present invention.

The modified asphalt cement of Example A is exposed to oxidative conditions and compared to the test minimum. The test employed is the Thin Film Oven Test (ASTM D-1754-78), a standard test method to evaluate the effect of heat and air on a film of semi-solid asphaltic material. A film of asphaltic material is heated in a specially equipped convection oven for 5 hours at 325° F. (163° C.) The amount of hardening is determined from changes in physical test values as measured before and after oven treatment. ASTM Procedure D-1754-78 is herein incorporated by reference.

The test results are summarized in the following Table I.

TABLE I

TEST RESULTS
THIN-FILM OVEN TEST
(ASTM D-1754-78)

| PROPERTY TESTED | United Refining AC-15 Untreated | United Refining AC-15 +0.5% Example B |
|---|---|---|
| % Loss on aging | .73 | .72 |
| Pen. @ 77° F. unaged | 58 | 63 |

TABLE I-continued
TEST RESULTS
THIN-FILM OVEN TEST
(ASTM D-1754-78)

| PROPERTY TESTED | United Refining AC-15 Untreated | United Refining AC-15 +0.5% Example B |
|---|---|---|
| Pen. @ 77° F. aged | 31 | 34 |
| Vis @ 140° F. (poise) unaged | 1516 | 1419 |
| Vis @ 140° F. (poise) aged | 3589 | 3234 |
| Vis @ 275° F. (cSt) unaged | 319.4 | 316.7 |
| Vis @ 275° F. (cSt) aged | 431.2 | 451.9 |
| Ductility @ 60° F. (cm.) unaged | 150+ | 150+ |
| Ductility @ 60° F. aged | 18.3 | 23.8 |

The modified asphalt cement of Example A also is subjected to the California Tilt-Oven Asphalt Durability Test developed by California Department of Transportation personnel in an effort to establish an accelerated laboratory procedure to simulate field aging in hot climates. The method, as well as data correlating laboratory and field aging, is published in the AAPT 1981 Proceedings. The presentation is entitled "A Comparison of Field and Laboratory Environments on Asphalt Durability". The authors are Glenn R. Kemp and Nelson H. Predoehl. The test procedure is correlated to 24 months in a hot desert climate.

The method utilizes the apparatus required for ASTM D-2872-84 (Rolling Thin Film Oven Test) with slight modifications to age asphalt at 235° F. (113° C.) for 168 hours. These conditions simulate the effect of field weathering for two years in a hot desert site. The effects of this age hardening are determined from measurements made on the residue.

The test results appear in the following Table II.

TABLE II
TEST RESULTS
CALIFORNIA TILT-OVEN ASPHALT DURABILITY TEST

| Test AC | CV-AR4000 Untreated | CV-AR4000 +3% Example 2 |
|---|---|---|
| PROPERTY TESTED | | |
| Vis. @ 140° F. (poise) - unaged | 2,134 | 1,262 |
| Vis. @ 140° F. (poise) - aged | 20,336 | 14,583 |
| Pen. @ 77° F. (dmm) - unaged | 36 | 46 |
| Pen. @ 77° F. (dmm) - aged | 10 | 9 |
| Ductility @ 77° F. (cm) - unaged | 150+ | 150+ |
| Ductility @ 77° F. (cm) - aged | 12.5 | 150+ |

The improvement in ductility at 77° F. after this severe laboratory aging procedure is noteworthy. It indicates that a roof or pavement will retain flexibility and ductility after long exposure to weathering.

Conventional asphalt additives also may be included in the modified asphalt compositions of the invention. For example, organic manganese compounds such as manganese naphthenate, manganese acetate, manganese octoate either alone or in combination with organic cobalt compounds are useful in improving the high temperature properties and increasing compressive, flexural and fatigue strength of cured road pavements. Asphalts containing such additives are described in U.S. Pat. No. 4,234,346, and the specification of this patent is incorporated herein by reference for its disclosure of manganese and manganese cobalt additives for asphalt.

The use of manganese chloride to modify the properties of asphalt cements is described in U.S. Pat. No. 4,244,747. The disclosure of this patent is herein incorporated by reference. Other functional additives can be included to improve water resistance, high and low temperature characteristics and age hardening.

I claim:
1. An asphalt concrete composition comprising at least about 85% by weight aggregate and
   (A) asphalt, and
   (B) from about 0.01 to about 5% by weight, based on the weight of the asphalt of at least one polymer which is a homoploymer of isobutylene or a copolymer of isobutylene, said polymer having a weight average molecular weight (Mw) of about 75,000 to about 130,000.
2. An asphalt concrete composition comprising at least about 85% by weight aggregate and a modified asphalt composition comprising:
   (A) asphalt, and
   (B) from about 0.01 to about 5% by weight, based on the weight of the asphalt of at least one polymer which is derived from isobutylene, said polymer having a weight average molecular weight (Mw) of about 5,000 to about 1,000,000, said polymer being mixed with the asphalt at a temperature between 100° and 225° C.
3. An asphalt concrete composition comprising at least about 85% by weight aggregate and the modified asphalt composition comprising:
   (A) a substantially unblown and unoxidized asphalt, and
   (B) from about 0.01 to about 5% by weight, based on the weight of the asphalt of at least one polymer which is a polymer of isobutylene, or a copolymer of said isobutylene with said polymer having a weight average molecular weight (Mw) of about 5,000 to about 1,000,000.
4. An asphalt concrete composition comprising at least about 85% by weight aggregate and
   (A) asphalt, and
   (B) from about 0.01 to about 5% by weight, based on the weight of the asphalt of at least one homopolymer wherein the homopolymer is derived from isobutylene.

* * * * *